United States Patent [19]
Kaewell, Jr. et al.

[11] Patent Number: 5,752,190
[45] Date of Patent: May 12, 1998

[54] SUPERVISORY AUDIO TONE BASED CARRIER-TO-INTERFERENCE MEASUREMENT IN A MOBILE CELLULAR COMMUNICATION SYSTEM

[75] Inventors: John D. Kaewell, Jr., Bensalem; David M. Cooley, Upper Darby, both of Pa.

[73] Assignee: Hughes Electronics, Los Angeles, Calif.

[21] Appl. No.: 99,503

[22] Filed: Jul. 30, 1993

[51] Int. Cl.$^6$ .................................................. H04Q 7/22
[52] U.S. Cl. ........................................... 455/436; 375/224
[58] Field of Search .............................. 370/29, 50, 69.1; 379/56, 58, 59, 60; 455/33.1, 33.2, 33.4, 403, 436; 375/224

[56] References Cited

U.S. PATENT DOCUMENTS

| | | | |
|---|---|---|---|
| 5,001,742 | 3/1991 | Wang | 379/60 |
| 5,067,171 | 11/1991 | Kawano . | |
| 5,134,708 | 7/1992 | Marui et al. | 455/33.2 |
| 5,175,867 | 12/1992 | Wejke et al. | 455/33.1 |
| 5,247,699 | 9/1993 | Hartman | 455/33.1 |
| 5,285,477 | 2/1994 | Hulsebosch | 370/69.1 |
| 5,293,641 | 3/1994 | Kallin et al. | 455/33.1 |
| 5,506,869 | 4/1996 | Royer | 375/224 |
| 5,603,087 | 2/1997 | Shultz | 455/52.3 |

OTHER PUBLICATIONS

Kerr, "Cellular Telephone Technology and Practice" 1986 pp. 3–8.

Engel, "The Effects of Cochannel Interference on the Parameters of a Small–Cell Mobile Telephone System", Vehicular Technology, vol. VT–18, Nov. 1969.

Cox, "Cochannel Interference Considerations in Frequency Reuse Small Coverage Area Radio System", IEEE, 1982.

Stocker, "CO–Channel Interference and its Avoidance in Cloase Spaced Systems" Vehicular Technology, vol. VT–31, Aug. 1982.

Schrenk, "Interference Management in Cellular System Design" 34th IEEE Vehicular Technology Conference, May 1984.

Femenias, Agusti, "Trellis–Coded 8–DPSK with Postdetection Vombining Diversity for Digital land Mobile Radio", IEEE, 1991.

Zander, "Distributed Co–channel Interference Control in Cellular Radio Systems", IEEE, 1992.

Halpern, "Adjacent and Co–Chanel Interference", Telecommunications vol. 18, #3, Mar. 1984.

Lee, "Fudamentals of Mobile Cellular Systems", IEEE Vehicular Technology Society Newsletter, Aug. 1985.

Mehrotra, "Cellular Radio Performance Engineering", pp. 241–250, 1994.

*Primary Examiner*—William Cumming
*Attorney, Agent, or Firm*—Wanda Denson-Low; John Whelan

[57] ABSTRACT

A Supervisory Audio Tone (SAT) based Carrier-to-Interference (C/I) ratio measurement system uses the SAT tone to determine the desired signal to undesired interferers so that an intelligent hand-off decision can be made in a digital cellular communication system. The measurement is implemented by digital signal processors which allows additional signal processing and subsequently noise rejection over analog techniques. The received level of the desired SAT as well as the received levels of the SATs for the co-channel interferers is detected. The ratio of the desired SAT level to the sum of the undesired SAT levels provides the C/I measurement. By monitoring this C/I measurement, the base station can determine when to make a hand-off. This SAT based C/I measurement system also aids in the selection of a candidate cell to which the subscriber is handed-off. Surveillance receivers in the candidate cells make SAT based C/I measurements as well as Received Signal Strength Indication (RSSI) measurements. The cell with the most favorable channel conditions would be the cell to which the hand-off is made.

9 Claims, 5 Drawing Sheets

SUPERVISORY AUDIO TONE BASED CARRIER-TO-INTERFERENCE MEASUREMENT IN A MOBILE CELLULAR COMMUNICATION SYSTEM

BACKGROUND OF THE INVENTION

1. Field of the Invention

The present invention generally relates to digital voice communications in a cellular system and, more particularly, to a method and apparatus for making measurements of Carrier-to-Interference (C/I) ratio using the Supervisory Audio Tone (SAT). By monitoring this C/I measurement, the base-station can determine when to make a hand-off.

2. Description of the Prior Art

A key feature of a cellular system is the ability to hand-off a mobile unit from one cell site to another cell site or to hand-off a mobile unit from one antenna at a cell site to a different antenna at the same cell site. Signal quality information is gathered by the serving cell as well as by neighboring cells. This information is transmitted to the Mobile Telephone Switching Office (MTSO). The MTSO decides whether a hand-off is necessary, and if it is, it selects an idle voice channel associated either with another antenna of the currently serving cell site or another cell site. The MTSO directs the cell site associated with the new voice channel to turn on the appropriate transmitter and to transmit the Supervisory Audio Tone (SAT). The MTSO directs the currently serving cell site to inform the mobile unit, via the forward voice channel, to tune to the new channel. Data transmission over the forward voice channel is accomplished by a technique known as blank-and-burst. The voice is blanked for about 50 msec. and a burst of data is sent over the voice path. The mobile unit, after receiving the hand-off command, sends a brief burst of Signaling Tone (ST) over the reverse voice channel to the currently serving cell site. The mobile unit then turns off its transmitter, tunes to the new voice channel, turns on its transmitter again, and transponds the SAT found on the new voice channel. The MTSO then reconfigures the switching network, connecting the other party to the new serving antenna. On receiving the transponded SAT, the cell site associated with the new serving antenna notifies the MTSO. The MTSO identifies the reception of the ST on the old channel and SAT on the new channel as a successful hand-off.

There are two types of hand-off; one based on signal strength and one based on carrier-to-interference ratio. The first type is easy to implement by measuring the received signal strength (RSS) at each cell site of all the signal strengths of all receives at the cell cite; however, since RSS is the sum of the carrier (C) signal power and the interference (I), strong interference can result in a high RSS level. Thus, even though a hand-off should be made because the carrier signal power is below a predetermined level, the high level of the RSS prevents the hand-off from being made. On the other hand, there are situations where the voice quality is good even though there is a low RSS level because the interference is low. This can result in an unnecessary hand-off. Hand-offs using carrier-to-interference (C/I) ratio provide a more accurate determination of when to make a hand-off. This is because the C/I ratio drops either because the propagation distance increases or the interference increases. In either case, hand-off should take place. Unfortunately, it is hard to measure C/I during a call.

Previously, the Supervisory Audio Tone (SAT) in a cellular communications system was detected with analog circuitry, usually with a phase-locked-loop (PLL) which gave the receiver the capability of only detecting whether the desired SAT was present or not. Classical land-line telephony defines supervision as the process of detecting changes in the switch-hook state caused by the customer. Mobile telephone supervision includes this process but has the additional task of insuring that adequate radio frequency (RF) signal strength is maintained during a call. In a frequency re-use mobile telephony system, care has to be taken that supervisory signals meant for a desired subscriber are not falsely received for a co-channel subscriber. In such a telephony system, a combination of a tone burst and a continuous out-of-band signal are used for supervisory purposes. These are known respectively as signaling tone (ST) and supervisory audio tone (SAT).

In digital mobile telephony systems, three Supervisory Audio Tones (SATs) are transmitted for performing supervision functions. These tones are closely spaced at only 30 Hz (5970 Hz, 6000 Hz and 6030 Hz). The basic concept calls for using SAT much as a land-line telephone system uses d.c. current and voltage. A mobile station receives a SAT from a cell site and transponds it back, closing the loop. The cell site looks for the specific SAT that it sent to be returned. If some other SAT is returned, the cell site interprets the incoming RF signal as being corrupted by an interfering subscriber.

The mobile station, on the other hand, must make a decision as to which SAT, if any, is present. The correct detection of SATs is a difficult problem. Normally, SAT detection is performed using a Phase Locked Loop (PLL). An analog PLL is a non-linear system whose performance characteristics are sensitive to environmental changes and subject to drift as the analog components age. A digital PLL can be used, but while a digital PLL is not subject to the same performance problems as an analog PLL, a digital PLL is computationally complex typically requiring a separate Digital Signal Processor (DSP). This adds to the expense of the system. For a more detailed discussion of cellular communications, in general, and, in particular, Hand-offs and Supervisory Audio Tone (SAT) signalling, the reader is referred to *Mobile Cellular Telecommunications Systems* by William C. Y. Lee, McGraw-Hill Book Co. (1989).

The quality of the received signal from a mobile unit by the base-station in a cellular system is limited by the amount of co-channel interference. One of the most important performance limiting factors of today's cellular systems is determined by the hand-off. The decision to make a hand-off, and to which cell to make a hand-off, are key to the perceived quality of the cellular system.

SUMMARY OF THE INVENTION

It is therefore an object of the present invention to provide an improved measurement of Carrier-to-Interference (C/I) ratio on which a cellular system hand-off decision is based, thereby greatly improving the cellular system's perceived quality.

According to the invention, there is provided a SAT based C/I measurement system which uses the SAT tone to determine the desired to undesired ratio of Carrier-to-Interference (C/I) ratio. Previously the SAT was detected with analog circuitry, usually with a phase-locked-loop which gave the receiver the capability of only detecting whether the desired SAT was present or not. This invention allows the measurement of the desired signal and the undesired interferers so that an intelligent decision can be made concerning hand-off. The invention is implemented by digital signal processors which allows additional signal processing and subsequently noise rejection over analog techniques. The received level of the desired SAT as well as the received levels of the SATs for the co-channel interferers is detected. The ratio of the desired SAT level to the sum of the undesired SAT levels provides the C/I measurement. By monitoring this C/I measurement, the base station can determine when to make a hand-off.

This SAT based C/I measurement system also aids in the selection of a candidate cell to which the subscriber is handed-off. Surveillance receivers in the candidate cells make SAT based C/I measurements as well as Received Signal Strength Indication (RSSI) measurements. The cell with the most favorable channel conditions would be the cell to which the hand-off is made.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
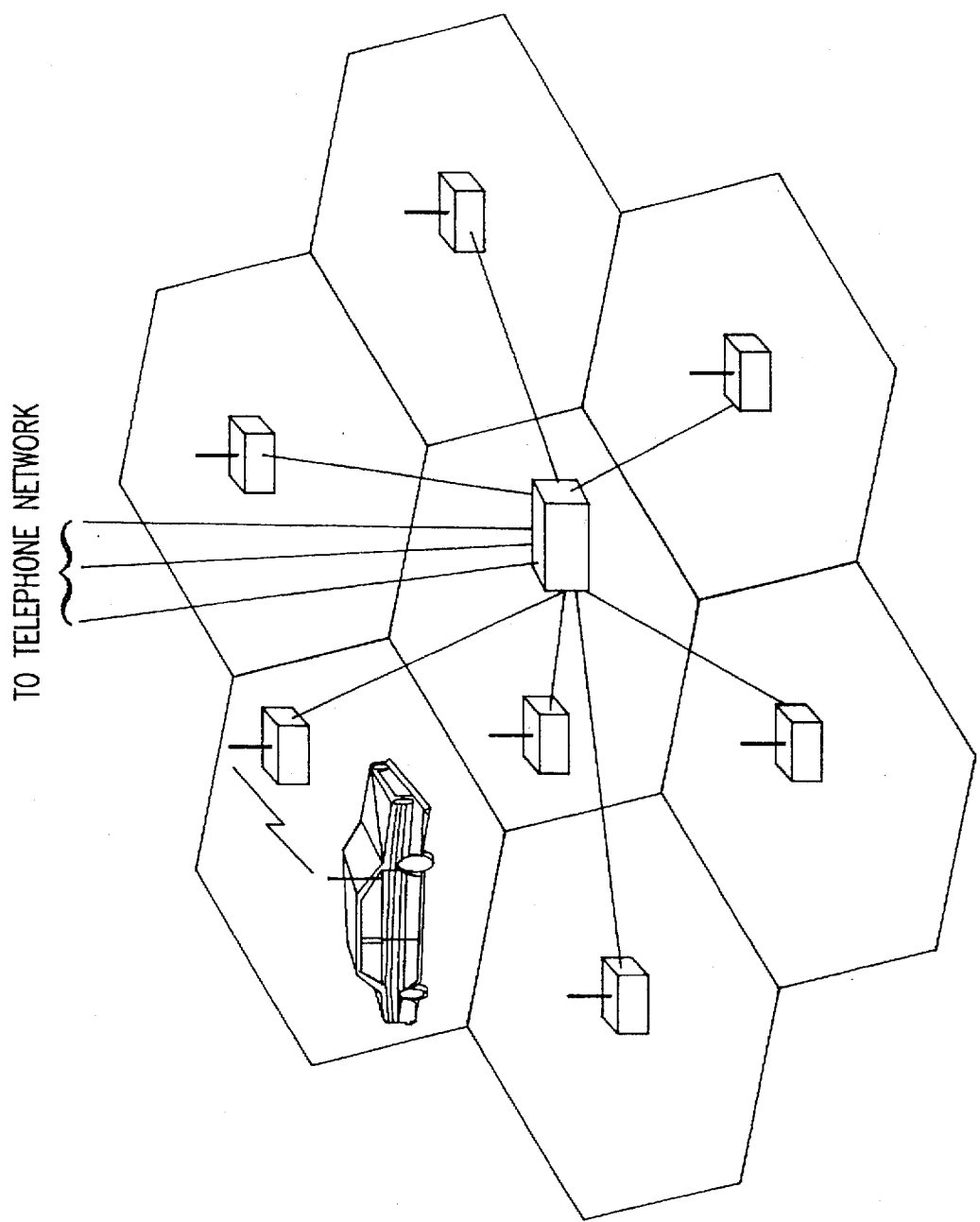
FIG. 1 is a pictorial diagram showing a typical mobile cellular communication system.

Referring now to the drawings, and more particularly to FIG. 1, there is shown a typical mobile cellular communication system which is the environment in which the subject invention is practiced. Each cell is represented as a hexagon and has within its boundaries a base station. The several base stations are connected to a Mobile Telephone Switching Office (MTSO) which provides the interface to the local telephone company central office. A subscriber unit, here represented as being installed in an automobile, communicates with the base station within the cell where that unit is currently located. As the subscriber unit moves from one cell to another, it is handed-off to the base stations of each successive cell that the subscriber unit traverses. This arrangement and the general operation is well known in the art, and for further background on the subject, the reader is referred to the text book by William C. Y. Lee, supra.

At the MTSO, an interface is made to T1 lines connecting to the local telephone company central office on the one hand and to the analog traffic channel unit of the digital cellular system on the other hand. The effective sampling rate of the digital cellular system equipment is 48.6 k-samples/sec. and, therefore, the 8 k-sample/sec processed speech signal has to be interpolated up to the 48.6 k-sample/sec. rate. Likewise, it is necessary to perform a sampling rate conversion of the 48.6 k-sample/sec. rate to 40.0 k-samples/sec. to give an integer number of samples (four) per FSK (frequency shift keying) symbol and to allow the eventual integer decimation of the speech signals down to the 8 k-sample/sec. PCM (pulse code modulation) rate for interfacing to the T1 transmission system.

Hand-off is needed in those situations where the cell site receives weak signals from a mobile unit. Typically, this occurs at the cell boundary or at a signal strength hole within the cell site. Additionally, there are situations where, due to co-channel interference, the quality of the received signal from a mobile unit by the base station falls below an acceptable level although the signal strength may still be acceptably high. An effective way to handle the co-channel interference problem is to hand-off the call to a different cell when the interference becomes too high. In the analog cellular system, a different Supervisory Audio Tone (SAT) is used to determine when the desired signal is received or not received. The original intention of the SAT tone was analogous to the off-hook signal present on a normal wire based telephone system. This invention uses the SAT tone to determine the desired to un-desired ratio of Carrier-to-Interference (C/I) ratio. The received level of the desired SAT as well as the received level of the SATs for the co-channel interferers is detected. The ratio of the desired SAT level to the sum of the undesired SAT levels provides the C/I measurement. By monitoring this C/I measurement, the base-station can determine when to make a hand-off.

Figure 2:
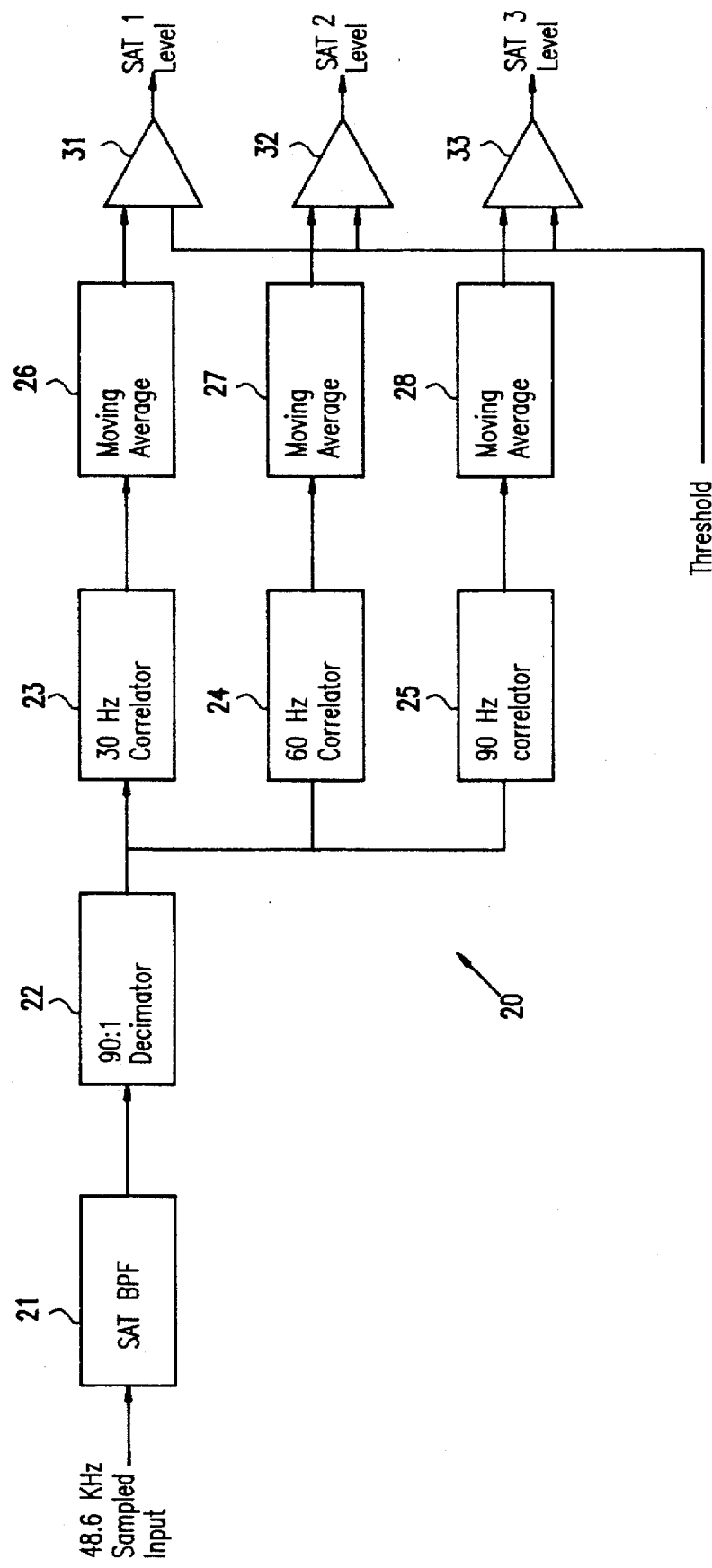
FIG. 2 is a block diagram of the Supervisory Audio Tone (SAT) detection system.

FIG. 2 shows a functional block diagram of the multirate Supervisory Audio Tone (SAT) detection system 10 used at the base stations. The input to this system is the output from an FM discriminator (not shown) sampled at 48.6 Khz, which is the sampling rate necessary for the system to operate in digital mode. This digital signal contains voice information in the 300 Hz to 3 KHz band, one of the three SAT tones (5970 Hz, 6000 Hz or 6030 Hz) and possibly a 10 KHz Signalling Tone (ST). The SAT bandpass filter 21 tightly filters the three SAT tones and acts as an anti-aliasing filter for the decimator 22.

Figure 3:
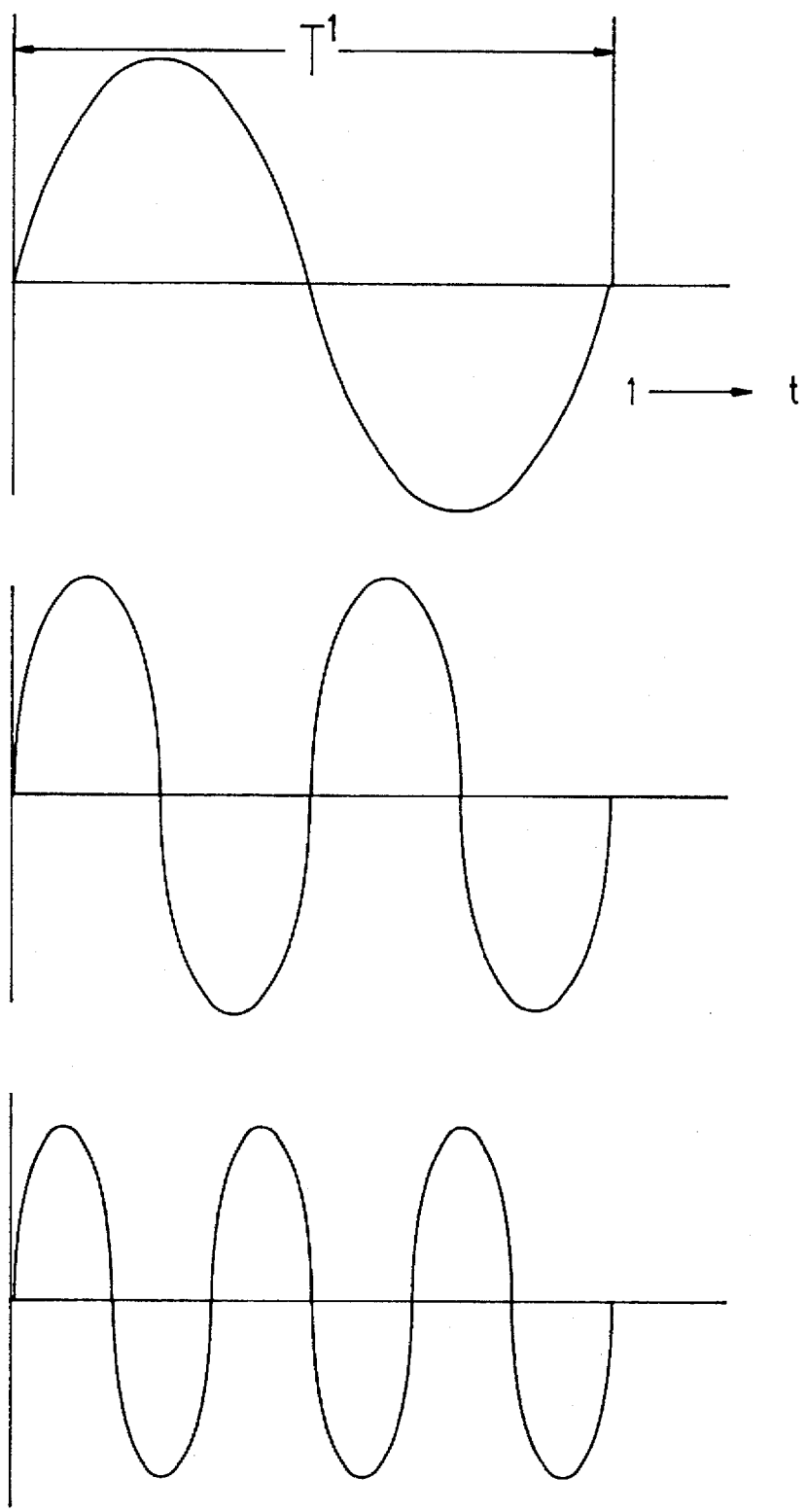
FIG. 3 is a graph showing an orthogonal function set of tones.

The decimator 22 performs a sampling rate conversion on the filtered SAT information. The 90:1 decimation process translates the SAT tones to 30 Hz, 60 Hz and 90 Hz, respectively. The new sampling rate is 540 Hz. The frequency translation is given by $$F_{new} = \left[ \frac{F_{old}}{F_s} \right] \cdot F_s,$$

where $F_{old}$ is the frequency at the input sampling rate, $F_{new}$ is the translated frequency at the output sampling rate ($F_s$), and the brackets represent the decimal portion of the division. The decimation process is performed so that the three SAT tones form an orthogonal set of frequency-division basis functions over the signal space. By using a 90:1 decimation and evaluating the decimator output over a 1/30sec. interval, the translated SAT tones form such a set, as shown in FIG. 3.

The output signal from the decimator 22 is applied to three correlators 23, 24 and 25 corresponding to the three SAT tones. The output from the correlators are given by $$Y_n = \left( \sum_1^K x(k)\cos(\omega_n kT) \right)^2 + \left( \sum_1^K x(k)\sin(\omega_n kT) \right)^2$$

for n=1, 2 and 3 (corresponding to the three SAT tones and where x(k) is the decimator output signal, 1/T=$F_s$, and K is the correlation length.

Figure 4:
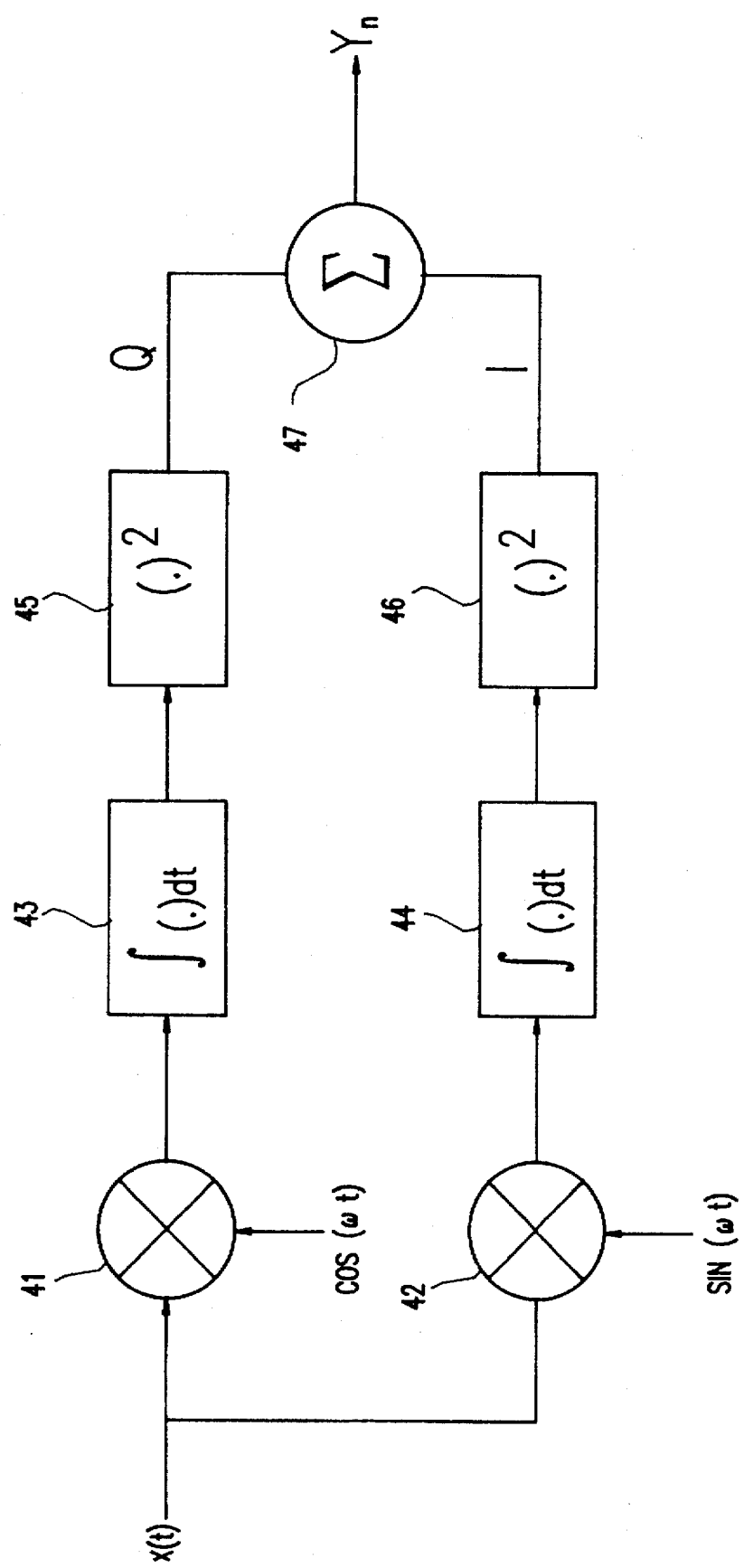
FIG. 4 is a block diagram of one of the correlators used in the SAT detection system shown in FIG. 2.

FIG. 4 shows a block diagram which is typical of the three correlators 23, 24 and 25. The output, x(t), of the decimator 22 is input to two multipliers 41 and 42 which respectively receive quadrature signals cos(ωt) and sin(ωt). The outputs of the multipliers are integrated by respective integrators 43 and 44, and the integrated outputs are squared by respective squarers 45 and 46 to form the two components which are summed in summer 47 to yield $Y_n$.

Returning to FIG. 2, the correlator outputs are averaged over the last three correlations (100 msec.) by moving average filters 26, 27 and 28, respectively, to improve system performance in a fading channel. The averaged output levels are compared to a threshold in corresponding comparators 31, 32 and 33. A hard decision is made based on this comparison. If a SAT level is greater than the threshold, the SAT acquisition is declared. In that event, and according to conventional practice, the mobile station transmits the SAT back to the cell site base station. If the level is less than the threshold, then a no SAT event is declared. Failure to detect and transmit the SAT back to the cell site base station within a predetermined period of time will, according to convention, result in the cell site base station terminating the call.

In the base stations of the cellular system shown in FIG. 1, SAT detection is performed by Digital Signal Processors (DSPs) using multirate signal processing techniques. That is, the DSPs perform the computations of the system illustrated in block diagram form in FIG. 2. The SAT detection system determines the level of all three SAT tones in the received signal. The largest magnitude greater than a threshold is reported as the detected SAT. If no SAT is above the threshold, a "NO-SAT-DETECTED" decision is reported.

Figure 5:
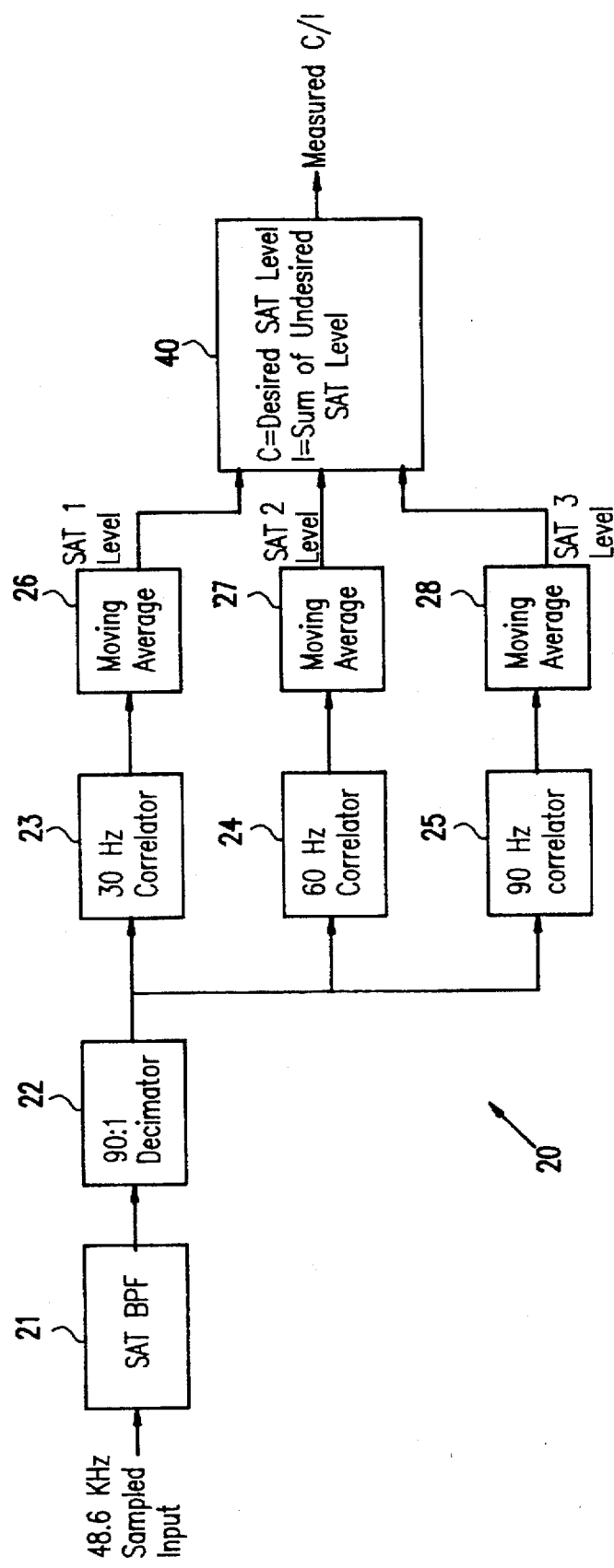
FIG. 5 is a block diagram of the SAT based C/I measurement system according to the present invention.

FIG. 5 shows a block diagram of the SAT based C/I measurement system according to the present invention. The processor 40 simply uses the raw SAT levels, already present in the SAT detection system represented as the outputs of the moving average filters 24, 27 and 28, to estimate the actual C/I ratio being experienced in the channel. The Carrier (C) power is equated to the level of the desired SAT. The interferer (I) is equated to the sum of the other two SATs. The C/I ratio in dB is computed in processor 51 as $$C/I \text{ dB} = 10 \log (C/I).$$

This computed C/I ratio is then used by the base station in its decision algorithm to determine whether or not to hand-off. The SAT based C/I measurement system, which is performed at all base stations, also aids in the selection of a candidate cell to which the subscriber is handed-off. Each cell site base station includes a surveillance receiver. The surveillance receivers in the candidate cells make SAT based C/I measurements as well as Received Signal Strength Indication (RSSI) measurements which are transmitted to the Mobile Telephone Switching Office (MTSO) shown in FIG. 1. The cell with the most favorable channel conditions based on these measurements is the cell to which the subscriber is handed-off.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A Supervisory Audio Tone (SAT) based Carrier-to-Interference (C/I) ratio measurement system for a base station in a digital cellular communication system comprising:

input means for receiving signals from mobile stations in said system, said signals including SATs;

correlation means responsive to said SATs for generating correlated outputs corresponding to each of said SATs; and processor means responsive to said correlated outputs for assigning a level of a desired SAT as a measure of Carrier (C) and summing said levels of undesired SATs as a measure of Interference (I), said processor means computing the ratio C/I and providing an output as a measure of C/I.

2. The SAT based C/I ratio measurement system recited in claim 1 wherein said input means comprises decimator means for receiving a sampled input signal including said SATs and translating said SATs to lower frequencies as an orthogonal set of functions, said correlator means being responsive to said translated SATs.

3. The SAT based C/I ratio measurement system recited in claim 2 wherein said input means further comprises bandpass filter means for passing said input signal including said SATs to said decimator means.

4. A method of making a hand-off decision at a Mobile Telephone Switching Office (MTSO) in a digital cellular communication system using a Supervisory Audio Tone (SAT) based Carrier-to-Interference (C/I) ratio measurement performed at each of a plurality of base stations, comprising the steps of:

receiving at a base station a sampled input signal including SATs;

generating correlated outputs corresponding to each of said SATs;

assigning a level of a desired SAT as a measure of Carrier (C);

summing levels of undesired SATs as a measure of Interference (I);

computing the ratio C/I; and transmitting from each base station to said MTSO a signal as a measure of C/I.

5. The method recited in claim 4 further comprising the step of translating said SATs to an orthogonal set of lower frequency functions prior to said step of generating correlated outputs.

6. In a cellular radio communications system having a plurality of base stations and a plurality of mobile stations communicating over radio channels identified by SATs (Supervisory Audio Tones), a first one of said plurality of mobile stations being in communication with a first one of said plurality of base stations, a method for establishing a criterion for handing said first mobile station off from communication with said first base station to communication with another base station comprising:

receiving a radio channel assigned to said first mobile station together with interfering radio channels;

filtering any received SATs from said received radio channel;

correlating said filtered, received SATs to generate a level associated with each SAT;

designating said level associated with the received SAT identifying said radio channel assigned to said first mobile station as C;

summing said levels associated with all other received SATs and designating said sum as I;

computing the ratio C/I and establishing C/I as said hand-off criterion.

7. The method as recited in claim 6 wherein said steps of receiving, filtering and correlating are performed at said first base station.

8. The method as recited in claim 6 further comprising the step of translating said SATs to an orthogonal set of lower frequency functions prior to said step of correlating.

9. The method as recited in claim 6 further comprising:

repeating said steps of receiving, filtering and correlating; and averaging said levels associated with each SAT over each repetition of said step of correlating so as to obtain an average level for each SAT; and substituting said average levels for each SAT for the corresponding ones of said levels in said steps of designating, summing as computing.

* * * * *